United States Patent [19]

Fenter

[11] Patent Number: 4,459,651

[45] Date of Patent: * Jul. 10, 1984

[54] REGULATED FLYBACK POWER SUPPLY USING A COMBINATION OF FREQUENCY AND PULSE WIDTH MODULATION

[75] Inventor: William S. Fenter, Marlboro, Mass.

[73] Assignee: Honeywell Information Systems Inc., Waltham, Mass.

[*] Notice: The portion of the term of this patent subsequent to Aug. 23, 2000 has been disclaimed.

[21] Appl. No.: 394,090

[22] Filed: Jul. 1, 1982

[51] Int. Cl.³ .................................... H02M 3/335
[52] U.S. Cl. ................................. 363/21; 363/49/97
[58] Field of Search ................... 363/18–21, 363/49, 97, 131; 323/901, 285–287, 299

[56] References Cited

U.S. PATENT DOCUMENTS 4,037,271  7/1977  Keller ................................. 363/21
4,400,767  8/1983  Fenter ................................ 363/21

*Primary Examiner*—Peter S. Wong
*Attorney, Agent, or Firm*—Faith F. Driscoll; Nicholas Prasinos

[57] ABSTRACT

A switching regulator power supply operates at a variable high frequency and pulse width with low power dissipation and a minimum of complexity. The transformer primary windings which are included as part of a self starting circuit start a pulse generator having a variable pulse width and variable frequency. During operation, the input RC network of the pulse generator, in response to the input rectified AC line voltage, conditions the pulse generator to generate output pulses whose widths vary as a function of changes in the input rectified AC voltge. An error circuit coupled to the secondary winding compares the output DC supply voltage to a reference voltage and generates an error signal which is applied through a coupling circuit for further adjusting the frequency of the pulse generator within a desired range to existing load conditions.

12 Claims, 20 Drawing Figures

SCALE:
50V/div.
2ms/div.

SCALE:
5V/div.
2ms/div.

SCALE:
5V/div.
2ms/div.

SCALE:
2V/div.
2ms/div.

SCALE:
50V/div.
2ms/div.

SCALE:
5V/div.
2ms/div.

SCALE:
5V/div.
2ms/div.

SCALE:
2V/div.
2ms/div.

SCALE:
2V/div.
5ms/div.

SCALE:
50V/div
10μS/div

SCALE:
50V/div
10μS/div

SCALE:
50V/div
10μS/div

SCALE:
50V/div
1μS/div

REGULATED FLYBACK POWER SUPPLY USING A COMBINATION OF FREQUENCY AND PULSE WIDTH MODULATION

BACKGROUND OF THE INVENTION

1. Field of Use

The present invention relates to apparatus for converting AC voltages to relatively low level DC voltages and more particularly to switching regulator power supply apparatus.

2. Prior Art

In general, computer equipment and associated peripheral equipment include their own internal power supplies. Such supplies are used to convert AC line voltages having the voltage ranges of 95-132 volts and frequencies of 50-60 Hertz into required DC voltages of 5-24 volts. In operation, these supplies generally have the AC line voltages applied to the primary windings of a step down transformer. The voltages induced in the secondary windings of the transformer are rectified, filtered and averaged to obtain the desired values of DC voltages.

As computer equipment and peripheral equipment become more compact and smaller in size, it becomes necessary to reduce the size weight and power requirements of the internal power supplies utilized therein. One approach has been to reduce the complexity of the high frequency switching circuitry associated with primary windings of the transformer. Examples of this approach are illustrated in U.S. Pat. Nos. 3,924,172, 4,005,790 and 4,128,867.

While the arrangements described in the above patents reduce the circuit complexity in this part of the power supply, the arrangements normally require additional circuitry which include separate line frequency transformers which power the control pulse circuits connected between the primary and secondary transformer windings. These arrangements may also include feedback circuits which couple to the line frequency transformer or bias transformer and circuits for providing power to operate the control circuitry during power supply operation.

Another approach is to employ a transformer flyback arrangement which utilizes a clock circuit which couples to the AC line power circuits through voltage doubling circuits. The clock circuit operates to generate a variable width pulse at a fixed frequency which is applied to power switching circuits which couple to the primary winding of the transformer. During the time interval defined by the width of the clock circuit pulse, the power switching circuits deliver power to the primary windings. At the end of the interval, the power switching circuits turn off causing current flow in the opposite direction through primary winding (transformer flyback). This induces a voltage in the secondary windings of a polarity which permits the transfer of energy to a load. At the end of this transfer cycle which occurs during transformer flyback defined by the fixed frequency of the clock circuit, another energy storage cycle is initiated. An amplitude pulse width converter compares the voltage output of the power supply with predetermined value and a feedback circuit DC couples signals from the converter for shortening the duration of the energy storage cycle by shortening the pulse width. An example of this type of arrangement is described in U.S. Pat. No. 4,001,663.

The above type of arrangement has been found to be quite complex due to the additional circuits required for furnishing power to the clock circuit and controlling the pulse width. More importantly, it has been found that such an arrangement cannot be easily controlled so as to minimize power supply consumption.

Accordingly, it is a primary object of the present invention to provide a light weight, compact and efficient power supply.

It is a further object of this invention to provide a switching regulator power supply which minimizes power consumption and maximizes energy transfer notwithstanding changes in input line voltage.

It is still a further object of the present invention to provide a switching regulator power supply which is easily constructed in integrated circuit form.

SUMMARY OF THE INVENTION

The above objects are achieved in a preferred embodiment of the switching regulator power supply of the present invention which couples to a source of input AC line voltage through a DC source of rectified AC line voltage and includes a pulse generator circuit for generating variable width pulses as a function of changes in the AC line voltage at a variable frequency rate.

In the preferred embodiment of the present invention, an input capacitor circuit couples to the primary windings of a transformer which couples to the pulse generator circuit. The pulses are applied to the primary transformer so as to cause current to flow therethrough during an energy storage cycle of the supply's regulation cycle of operation. An input network is associated with the generator circuit and includes a series connected resistor and capacitor which connects to the input capacitor circuit.

During a first time interval, the input network is operative to charge the capacitor to a first predetermined threshold voltage through the resistor at a rate established by the magnitude of AC rectified voltage applied by the input capacitor circuit. When the first predetermined threshold voltage is reached, the pulse generator circuit switches state which defines the width of the output pulse being generated. During the succeeding time interval or second time interval, the network is operative to discharge the capacitor to a second predetermined voltage at a predetermined rate. When the second predetermined threshold voltage is reached, the generator circuit is triggered to generate another output pulse. This defines the frequency of the output pulses.

By making the pulse width directly proportional to the magnitude of AC line voltage, the switching regulator supply of the present invention is able to minimize energy and maintain a constant transfer of energy to loads connected thereto.

The preferred embodiment further includes a voltage to frequency converter circuit which monitors the secondary power supply voltage and generates a voltage error signal which is DC coupled through an optical coupler circuit included therein for controlling the frequency or pulse rate of the pulse generator circuit. When the error signal indicates that the secondary voltage is higher than a reference voltage, the optical coupler circuit is switched on which inhibits the pulse generator circuit from generating further pulses. This is done by holding the generator trigger voltage which corresponds to the second predetermined threshold above the normal voltage threshold thereby preventing the generation of further output pulses.

By controlling the rate at which the pulse generator circuit generates variable width pulses in turn establishes the number of energy storage cycles required for maintaining desired values of power supply voltages as a function of load conditions. When little or no power is being dissipated by the load, the error circuit generates an error signal turning on the optical coupler circuit which decreases the operating frequency to a minimum. This, in turn, minimizes the power requirements of the power supply circuits and maximizes efficiency. Utilizing optical coupling in lieu of transformer coupling for controlling the turn on of the pulse generator circuit further reduces circuit complexity.

In accordance with the teachings of the present invention, the apparatus is operative to adjust the pulse width with the effects of any persistant line disturbances and transients. This permits the pulse generator to operate at a frequency which is just outside the audio range. Therefore, switching losses are reduced and operation requires less energy is made more efficient. Additionally, it has been found varying the pulse width as a function of input AC voltage reduces the amount of necessary frequency correction as a result of load conditions. The result is that the combination of pulse width and frequency correction facilitate the establishing of the desired transfer of energy.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

DESCRIPTION OF THE PREFERRED EMBODIMENT

Figure 1:
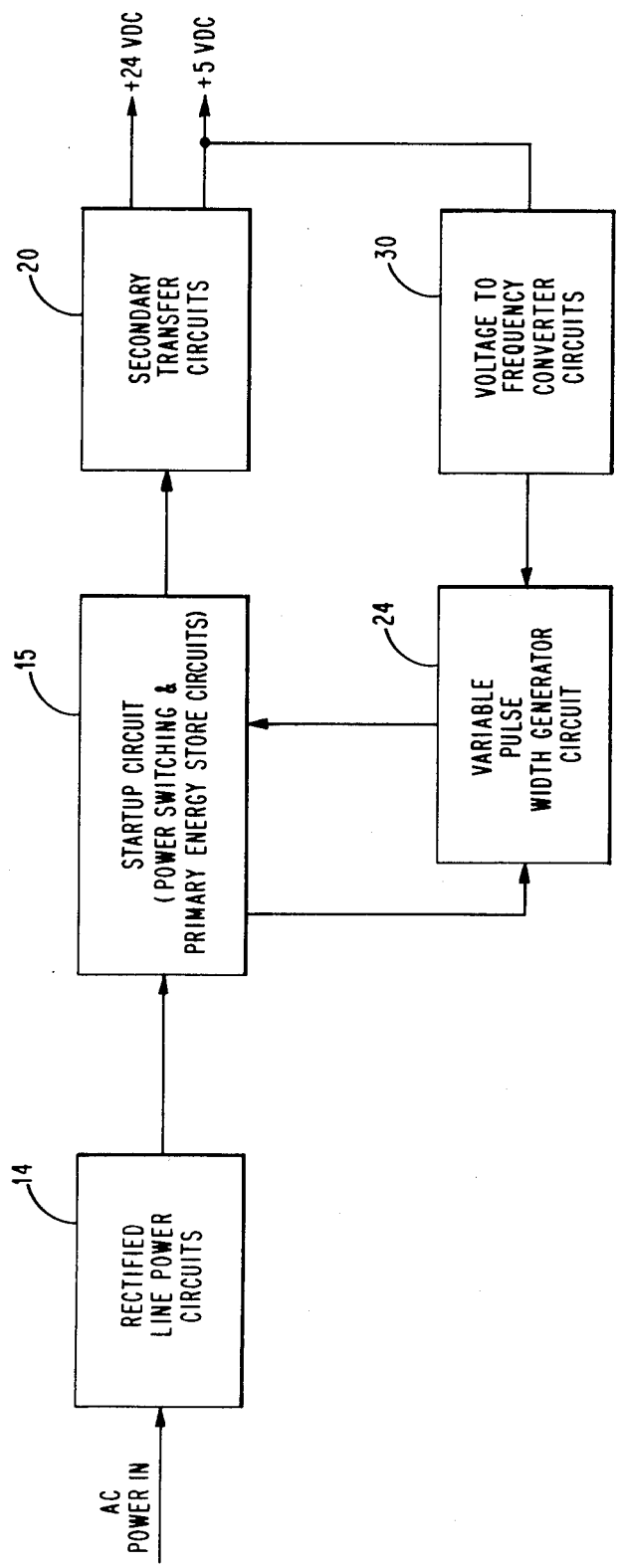
FIG. 1 is a block diagram of the regulated power supply of the present invention.

FIG. 1 illustrates in block diagram form, the preferred embodiment of the switching regulator power supply of the present invention. As shown, AC power is applied to the circuits of block 14. The output AC rectified power is applied to the start-up circuit of block 15. This circuit which includes the power switching and primary energy storage circuits applies an initial output voltage to the variable pulse width generator circuit of block 24 sufficient to start it operating. The generator circuit 24 generates an output voltage which enable the primary energy storge circuits to store energy and feed energy back to the start-up circuit which produces an output voltage sufficient for normal operation of the generator circuit 24.

At the end of each pulse, the primary storage circuits of block 15 transfer energy to the secondary transfer circuits of block 20 which provide the desired +24VDC and +5VDC output voltages. The circuits of block 30 compare the power supply output voltage with a reference voltage and generate an output which adjusts the frequency of the generator circuit of block 24.

Figure 2:
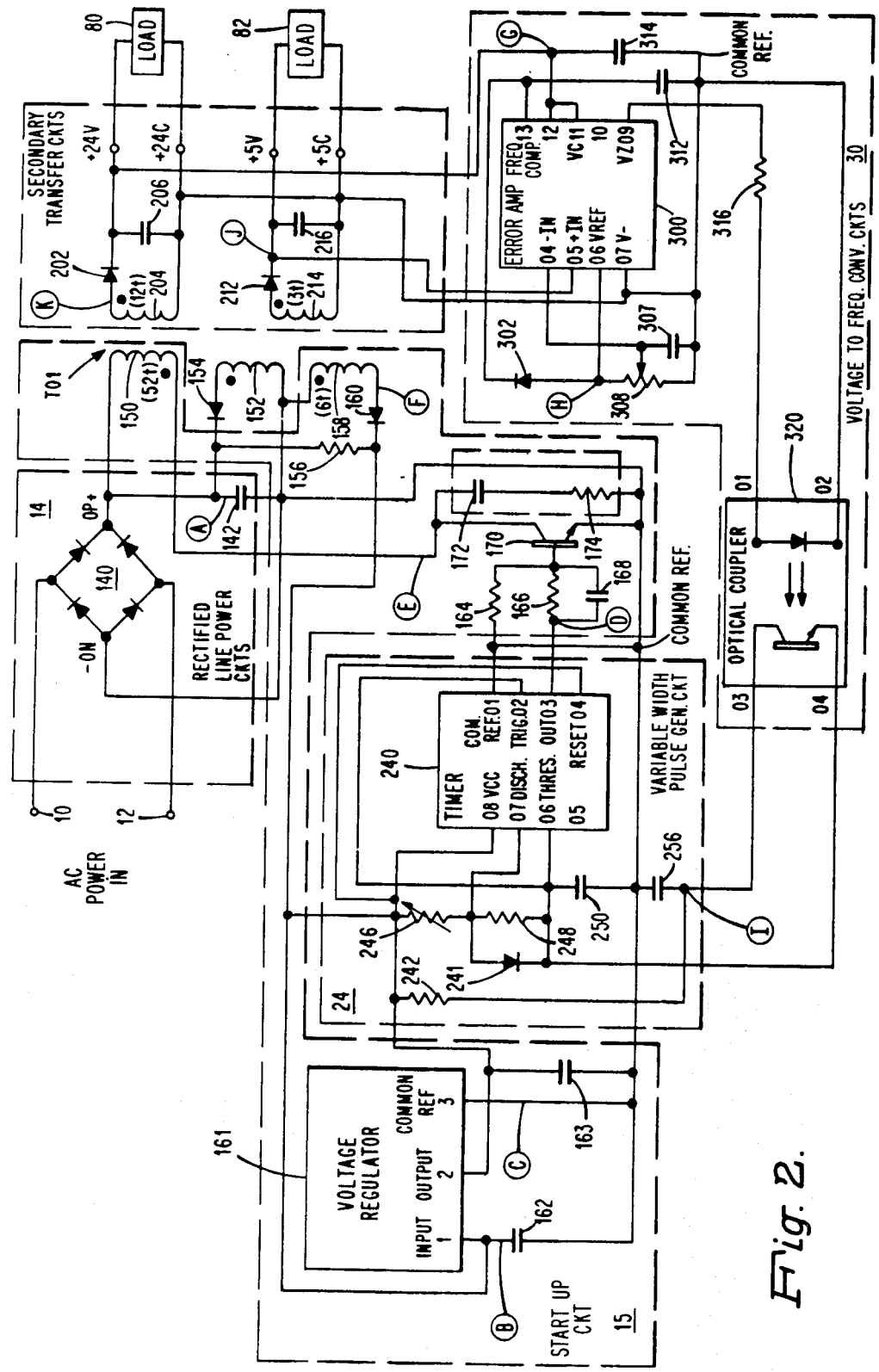
FIG. 2 shows in greater detail the blocks of FIG. 1.

FIG. 2 shows in greater detail, the circuits of each of the blocks of FIG. 1.

Power Circuits 14

As seen from FIG. 2, the power circuits of block 14 include the four rectifier diodes connected as a full wave rectifier bridge 140 and a filter capacitor 142. The rectified AC is applied via positive and negative output terminals OP and ON to filter capacitor 142. The capacitor 142 output voltage is applied to the start-up circuit of block 15.

Start-Up Circuit 15

The start-up circuit of block 15 includes primary windings 150 and 158 of a transformer T01, a power switching transistor 170 and its associated resistors and capacitors 164, 166, 168, 172 and 174 which connect as shown and an RC controlled voltage regulator circuit 161 with associated resistors and capacitors 156, 162 and 163. The RC input network to circuit 161 consisting of a resistor 156 and a capacitor 162 connects to a primary feedback winding 158 and series diode 160 and controls the amount of voltage applied to voltage regulator circuit 161. Capacitor 163 serves to filter any noise signals appearing at the output of circuit 161.

The primary windings 150 and 158 are wound with the polarities as shown by the dots. The remaining primary winding 152 with the indicated dot polarity together with series connected diode 154 operates as a snubber network during power supply operation. This is, it cancels out the effect of the voltage spikes or transients caused by load conditions resulting from transformer leakage inductances. Hence, it is not considered as part of the start-up circuit 15. As indicated in FIG. 2, the primary feedback winding 158 has fewer number of turns as compared to winding 150 so as to provide a 52 to 6 turns ratio. This permits the appropriate amount of energy to be fed back to the other circuits within start-up circuit 15 for completing the start-up operation of circuit 24.

The voltage regulator circuit 161 of the preferred embodiment is constructed from an IC voltage regulator having the designation uA7812 described fully in the publication "Voltage Regulator Handbook", published by Fairchild Camera and Instrument Corporation, Copyright 1978. The input starting voltage is applied to input terminal 1 from the output of the RC network formed by resistor 156 and capacitor 162. When the voltage at terminal 1 reaches a value between 4.5–5V, the circuit 161 produces an output voltage at output terminal 2 sufficient to begin the operation of pulse generator circuit 240.

It will be appreciated that the regulator circuit 161 continues to produce an output voltage which is proportional to the input voltage. When the input voltage reaches the desired output value, here 12 volts, any further change in input voltage causes no change in output voltage. While other circuit arrangements can be utilized to provide a similar mode of operation (e.g. voltage source and zener diode), they require additional power thus reducing power supply efficiency.

Pulse Generator Circuit 24

As seen from FIG. 2, the circuits of block 24 include a variable pulse width variable frequency generator 240 having an input network. The input network includes, according to the present invention, a variable resistor 246, a resistor 248, a diode 241 and a capacitor 250. The resistor 246 connects at one end to input capacitor 142 through transformer 158 in common with capacitor 162. The diode 241 connects across resistor 248 which connects in series with resistor 246.

As shown, block 24 further includes a network consisting of resistor 242 which connects to the output of regulator circuit 161 and a decoupling capacitor 256 connected as shown.

The generator 240 of the preferred embodiment is constructed from an LM555 timer circuit manufactured by major integrated circuit manufacturers. The terminals 2 and 6 are connected together so that circuit 240 when enabled as explained herein can trigger itself and free run as a multivibrator. The voltage generated by voltage regulator circuit 161 is applied to the supply voltage terminal 8 of circuit 240. Terminal 1 connects the internal circuits to the common reference potential at point ON as shown.

Under the control of regulator circuit 161, the supply voltage of generator circuit 240 is varied between 3.5 volts and 12 volts. Under the control of regulator circuit 161, the capacitor 250 connected between threshold input terminal 6 and terminal 2 charges through resistor 246 toward the value of the transformed AC voltage stored by input capacitor 142. The rate of charging is established by the magnitude of input AC voltage. The capacitor 250 discharges through resistor 248. The diode 241 which connects across resistor 248 is forward biased during its the charging of capacitor 250 and reverse biased during its discharge through resistor 248 and terminal 7.

The charge time corresponds to the period during which output terminal 3 is high. The discharge time corresponds to the period during which output terminal 3 is low.

As seen from FIG. 2, the threshold terminal 6 of circuit 240 connects in series with an optical coupler and the network which consists of decoupling capacitor 256 and resistor 242. As explained herein, when the optical coupler circuit 320 of block 30 is on, resistor 242 is connected to form a voltage divider with resistor 248 during the discharge time of capacitor 250 (i.e., terminal 7 provides a discharge path to ground or zero volts through a transistor). This holds terminal 2 at a predetermined positive voltage which inhibits generator circuit 240 from triggering itself. This positive voltage is selected to be approximately 4.5 VDC which is just slightly higher than the triggering voltage of 4 VDC. This enables retriggering to take place within a minimum of delay enabling the power supply to respond immediately to changes in load conditions.

In operation, when sufficient voltage is applied to terminal 8 of generator circuit 240 by circuit 161, capacitor 250 begins to charge at which time the generator circuit 240 applies a positive voltage to output terminal 3. When the voltage applied to terminal 6 reaches a predetermined threshold, this causes circuit 240 to switch its output terminal 3 to a low voltage. At this time, circuit 240 enables capacitor 250 to discharge toward zero volts. Upon being discharged to a predetermined voltage, the generator circuit 240 triggers itself.

The positive output pulse from circuit 240 is applied via an input RC network which consists of resistors 164 and 166 and a coupling capacitor 168 to the base of an NPN transistor 170. The emitter terminal of transistor 170 of the start-up circuit connects to the common reference ON. The collector terminal connects to a snubber network consisting of series connected capacitor 172 and resistor 174 which operates to suppress transients.

Secondary Circuits 20

The secondary windings 204 and 214 with the turns indicated (i.e., 12 turns, 3 turns) step down the primary voltage so as to provide the desired +24 VDC and +5 VDC output supply voltages. These windings have polarities which are opposite to that of primary winding 150 which permit energy transfer to the loads to take place only during transformer flyback. Additionally, as explained herein, such loads are disconnected from the secondary circuits while energy is being stored in the primary windings.

The secondary windings 204 and 214 connect to the anodes of diodes 202 and 212 respectively. The cathodes of diodes 202 and 212 connect to output filter capacitors 206 and 216 respectively. As shown, the capacitor 206 connects to a pair of output terminals +24 V and +24 C to which the load represented by block 80 is applied. Similarly, capacitor 216 connects to another pair of output terminals +5 V and +5 C to which the load represented by block 82 is applied. These outputs also are applied to the circuits of block 30.

Voltage to Frequency Converter 30

The circuits of block 30 include an error amplifier circuit 300 which is constructed from a standard integrated circuit designated as uA723, manufactured by Fairchild Camera and Instrument Corporation. This circuit is also described in the previously mentioned Fairchild Corporation publication.

As seen from FIG. 2, terminal 4 connects to the output of a variable resistor 308 which connects at one end to a voltage reference (VRef) terminal 6 and at the other end to a secondary common reference potential. The resistor 308 divides down the 7 volt reference voltage applied to (VRef) terminal 6 to a 5 volt value which is applied to (−IN) terminal 4. Terminal 7 connects to the secondary common reference voltage potential while (+IN) terminal 5 connects to the positive supply output voltage (+5 V) applied to load 82. The cathode and anode of a diode 302 connect to terminals 6 and 13 respectively. This stabilizes the operation of error amplifier 300 by clamping the internal transistor collector voltage at terminal 13 to the reference voltage on terminal 6. This maintains a constant reference voltage at terminal 13.

Terminal 13 connects to a compensation capacitor 312 and to the cathode of diode 302 whose anode connects to terminal 6. Another V+ terminal 12, connected to a (VC) terminal 11, connects to the positive supply output voltage (+24 V) and to bypass capacitor 314.

The circuit 300 generates an error voltage by comparing the voltage at terminal 5 relative to the reference voltage applied to terminal 4. The difference voltage is amplified and applied through a zener diode to terminal 9.

The voltage at terminal 9 is applied through a resistor 316 to the input terminal 1 of optical coupler circuit 320. The other input terminal 2 of circuit 320 connects to the secondary common reference voltage. The optical coupler output terminals 3 and 4 connect as shown to capacitor 256 and resistor 242 respectively.

In the preferred embodiment, optical coupler 320 is constructed from a standard integrated circuit designated as H15A1 manufactured by General Electric Corporation. The very high isolation voltage characteristics of the circuit provides the desired DC coupling between error amplifier circuit 300 and generator circuit 240 for controlling the operation thereof. Initially, error amplifier circuit 300 produces no error output thereby placing coupler circuit 320 in an off state. Thus, output terminals 3 and 4 are unconnected (i.e., open). In response to an error voltage, coupler circuit 320 is switched on connecting together output terminals 3 and 4.

As explained herein, the operation of generator circuit 240 is controlled as a function of the error output voltage produced by error circuit 300 by switching coupler circuit 320 on and off.

DESCRIPTION OF OPERATION

Figure 3A:
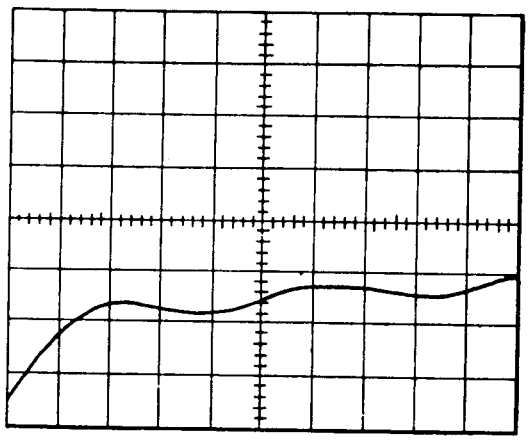
FIGS. 3A through 3J illustrate a series of waveforms used to explain the operation of the switching power supply of the invention.

With reference to FIG. 2 and the waveforms of FIGS. 3A through 3J, the normal start-up operation of the preferred embodiment of the present invention will now be described. When the power supply is turned on, AC power is applied to full wave bridge rectifier 140. During normal condition, the rectified AC voltage appearing at terminals OP+ and −ON approximate 160 volts peak. This voltage charges input filter capacitor 142 to 160 VDC as shown by the waveform of FIG. 3A.

The voltage across capacitor 142 is used to charge RC network capacitor 162 through resistor 156. As discussed previously, the value of resistor 156 is selected to provide enough current (i.e., approximately 8 milliamperes) to start the generator circuit 24 during normal conditions while at the same time minimizing the amount of power dissipated. This permits the power supply to operate with convection cooling eliminating the need for forced air cooling by a fan.

Figure 3B:
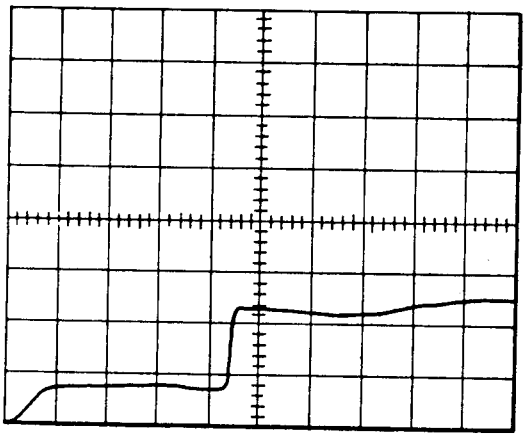

As seen from the waveform of FIG. 3B, the voltage across capacitor 162 begins to rise at the rate shown. The time constant or charging rate established by resistor 156 and capacitor 162 is made short as compared to the time for charging capacitor 142 (i.e., 2 milliseconds and 20 milliseconds as shown in waveforms of FIGS. 3A and 3B). This provides the desired response time for the power supply during start up.

Figure 3C:
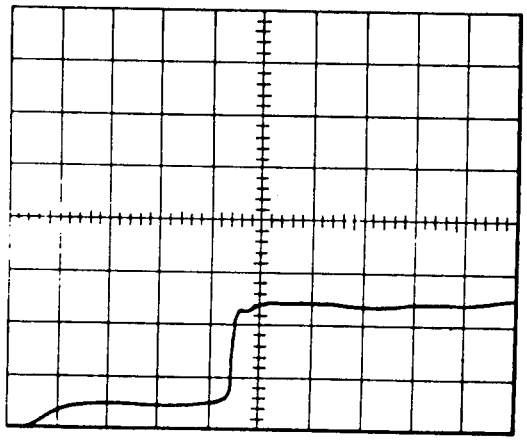

As soon as the voltage of capacitor 162 increases to approximately 5.0 volts, regulator circuit 161 generates a positive going output voltage at terminal 3 as shown in the waveform of FIG. 3C. At this time, as seen from waveform 3I, the coupler circuit 320 is in an off state. Hence, the time required to charge and discharge capacitor 250 will be established by resistors 246 and 248 respectively.

Figure 3D:
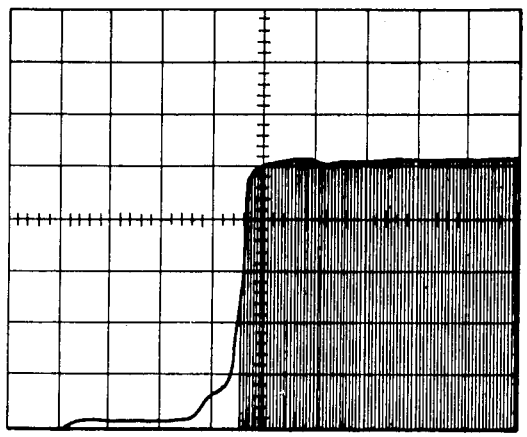

The voltage at terminal 3 is sufficient when applied to the VCC terminal 8 of the pulse generator circuit 240 to cause it to begin generating a positive going output pulse at terminal 3 as shown by the waveform of FIG. 3D.

Figure 3E:
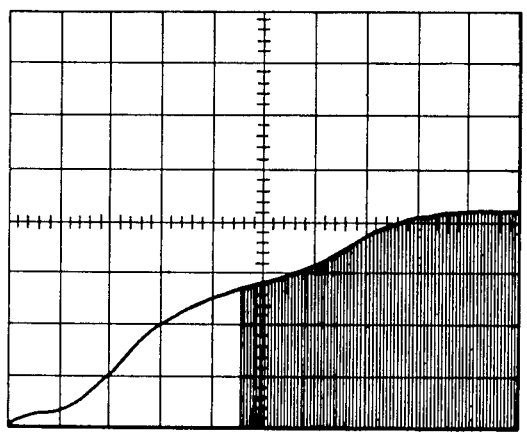
Figure 3F:
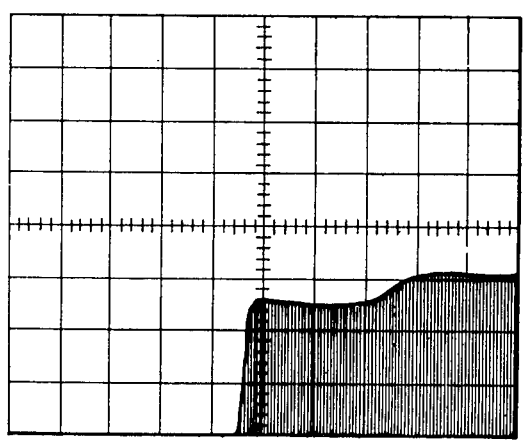

This positive going voltage when applied to the base of transistor 170 via resistor 166 and capacitor 164 is sufficient to switch transistor 170 into saturation since there is no current flowing through the primary winding of the transformer. This is illustrated by the waveform of FIG. 3E.

It will be noted that the voltage on filter capacitor 142 is now applied across primary winding 150 of the transformer causing current to flow therethrough. Capacitor 142 begins to discharge through transistor 170. By means of transformer action, a voltage of 18 VDC is induced in step down primary winding 158 as shown in waveform 3F of FIG. 4. This positive voltage when applied to previously reverse biased diode 160 causes it to conduct and further charge capacitor 162 from a 5 VDC to its normal operating value (15 VDC) as indicated by the second step in the waveform of FIG. 3B.

When regulator circuit 161 receives this normal operating voltage, it operates to clamp or maintain its output voltage to the regulated 12 VDC value. Hence, the 12 VDC is applied as the supply voltage to terminal 8 of the circuit 240 causing it start normal operation wherein it produces pulses having a nominal pulse width of 6 microseconds. That is, the resistance value of resistor 246 is adjusted to establish a desired charge rate for capacitor 250 at the nominal voltage applied to point B which provides the desired pulse width of 6 microseconds. This takes place after the first cycle of operation.

Figure 4A:
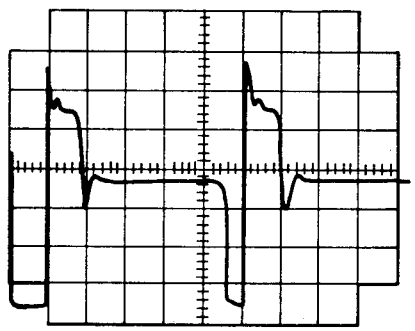
FIGS. 4A through 4H illustrate the operation of the power supply at various values of input AC line voltages.
Figure 4B:
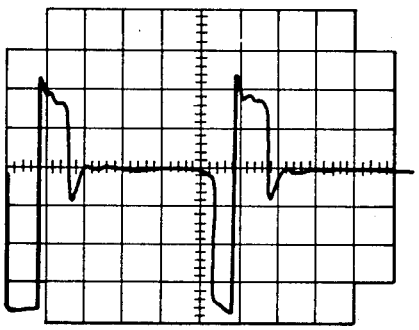
Figure 4C:
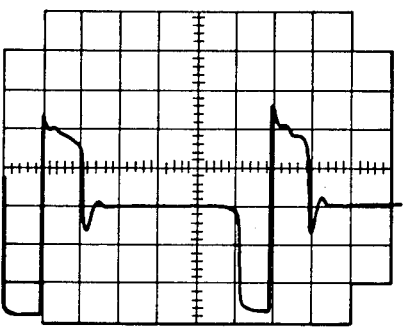
Figure 4D:
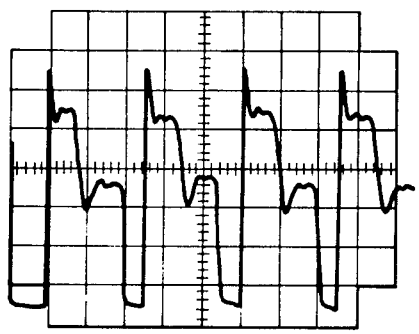
Figure 4E:
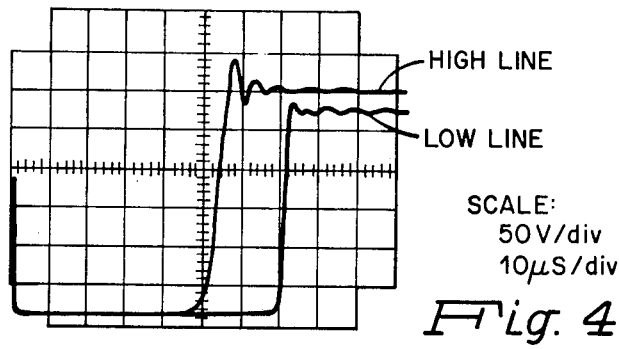

As seen from the waveform of FIG. 3D, initially generator circuit 24 runs at maximum frequency producing the series of six microseconds width pulses shown in greater detail in FIG. 4E since the output capacitors 206 and 216 and loads have not been brought up to normal operating conditions. That is, until the +24 VDC and 5 VDC output voltages reach their desired values, no error voltage is generated by circuit 300 as explained herein for altering the frequency of circuit 240.

Briefly, summarizing the above, it is seen that the start-up circuit 15 applies sufficient supply operating voltage to generator circuit 24 causing it to generate an output voltage. This voltage saturates transistor 170 which causes the start-up circuit 15 to produce further current so as to increase the supply voltage to the value required for normal operation of the pulse generator circuit 240.

Figure 3G:
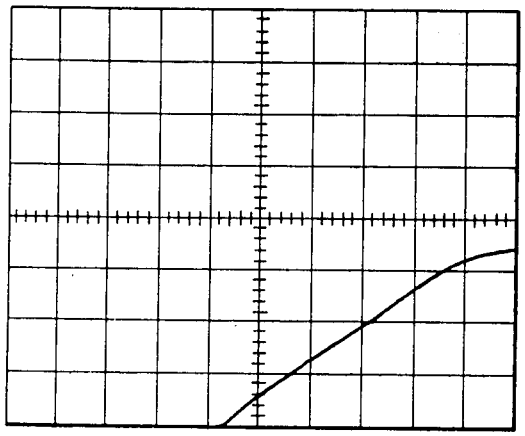
Figure 3H:
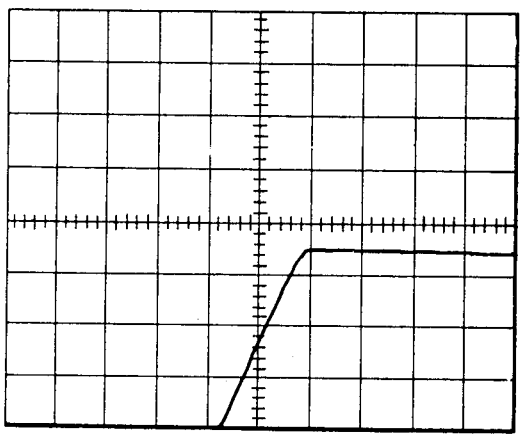
Figure 3I:
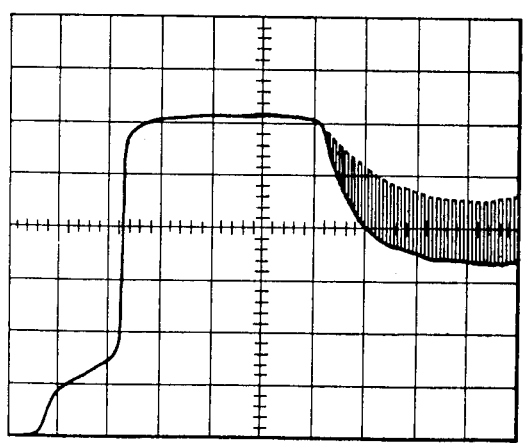
Figure 3J:
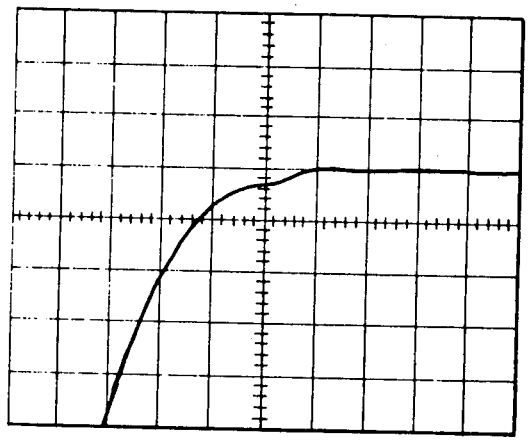

At the end of the first cycle of operation defined by the pulse width output of circuit 240, transistor 170 switches off. This interrupts the current flow through primary winding 150 causing a reverse emf or back voltage to be generated in winding 158 by the magnetic field produced in the opposite direction. Also, this induces voltages of the polarity required for forward biasing diodes 202 and 212. The result is that output filter capacitors 206 and 216 begin charging as shown by the waveforms of FIGS. 3G and 3J. After a number of cycles of operation of circuit 240 at maximum frequency, the +5 VDC output supply voltage shown in the waveform of FIG. 3J increases above the 5 VDC reference voltage applied to terminal 4. At this time, error amplifier circuit 300 operates to generate an output error voltage at terminal 9. This voltage switches on coupler circuit 320 as shown by the waveform of FIG. 3I. At this time, resistor 242 is connected to the cathode of diode 241 holding the voltage that point at slightly above the threshold point at which generator circuit 240 triggers (i.e., 4.5 VDC). Thus, circuit 240 is inhibited from generating further output pulses. This, in turn, prevents further energy from being stored and transferred to the secondary circuits and loads.

As soon as the error amplifier circuit 300 detects that the +5 output supply voltage is not at the desired operating value, it switches off coupler circuit 320. This permits capacitor 250 to immediately discharge to the desired threshold voltage for triggering generator circuit 240. As previously mentioned, holding the threshold voltage just slightly above the triggering threshold, permits the power supply to respond to changes in line and load conditions within a minimum amount of time (i.e., within less than one microsecond).

The changes in pulse width as a function of changes in input line AC voltage are illustrated by the waveforms of FIGS. 4A through 4C. The waveforms of FIGS. 4A through 4C are taken at point E of FIG. 2 in order to illustrate the amount of energy being delivered to the primary of transformer T01 as a function of input AC line voltage applied to terminals 10 and 12 of FIG. 2. The waveform of FIG. 4A illustrates the pulse width at the nominal line voltage of 120 volts. As discussed above, the resistance of resistor 246 is adjusted to provide a nominal pulse width of 6 microseconds. By utilizing an adjustable resistor, this makes it possible to overcome any differences in the internal delays produced by pulse generator circuit 240.

FIG. 4B illustrates the decrease in generator pulse width from the nominal value when the input AC line voltage is at a maximum value termed a "high line" condition. In greater detail, during operation when the AC voltage assumes a high line condition (i.e., value of 135 volts) the voltage applied to input terminal 1 of regulator circuit 161 by capacitor 142 increases proportionately. This, in turn, causes capacitor 250 to charge at a faster rate through resistor 246. Accordingly, this results in pulse generator circuit 240 being switched earlier producing an output pulse whose width is less than 6 microseconds (i.e., 5.2 microseconds).

FIG. 4C illustrates the increase in generator pulse width when the input AC line voltage is at a minimum value termed a "low line" condition.

In greater detail, when the AC voltage assumes a low line condition (i.e., a value of 100 volts), the voltage applied to input terminal 1 by capacitor 142 decreases proportionately. This, in turn, causes capacitor 250 to charge at a slower rate through resistor 246. Accordingly, the result is that pulse generator circuit 240 switches state at a later point in time producing an output pulse whose pulse width is greater than 6 microseconds (i.e., over 7 microseconds).

From the above, it is seen as the input AC line voltage varies up and down, the pulse generator circuit 240 will modulate its output pulse width accordingly. Thus, at a high line, a narrower pulse width is produced which provides current through the primary of transformer T01 for a shorter interval of time. Thus, since there is more voltage being applied to the primary of transformer T01 during such "high line" condition, the power or energy being provided to the primary of transformer T01 means essentially constant.

The opposite is true for the "low line" condition. That is, at a low line, a wider pulse width provides current through the primary of transformer T01 for a longer time interval. Thus, since there is less voltage being applied to the primary of transformer T01 during such "low line" condition, the power or energy being provided to the primary of transformer T01 remains essentially constant.

FIG. 4E shows a waveform taken at point E of FIG. 2 at normal line voltage of 120 volts during full or maximum load conditions. A comparison of FIGS. 4A and 4D illustrate the changes in the frequency of pulse generator circuit 240. While the operating frequency of circuit 240 increases and decreases as a function of load requirements, it has been found that by varying the pulse width as a function of changes in input line voltage, this permits the frequency of circuit 240 to be held fairly constant. Thus, at a "high line", the pulse generator circuit 240 is prevented from having to decrease its frequency to come within an undesirable range (audible) in order to have minimal energy transferred to the load. Similarly, in the case of a "low line", the circuit 240 is prevented from having to increase its frequency to operate within an undesirable range (high losses), in order to have maximum energy transferred to the load. Accordingly, the arrangement of the present invention permits the power supply to operate at near constant energy transfer under constant load conditions and to make energy trnsfer adjustments which better match changes in load conditions.

FIGS. 4D and 4F through 4H illustrate the variation of pulse width at various circuit points when there are changes in input AC line voltage.

More specifically, FIG. 4D illustrates the change in frequency at point E of FIG. 2 as a function load (i.e., increase in load causes an increase in frequency).

FIG. 4E shows in greater detail the variations in pulse width at point E of FIG. 2 from high line to low line conditions.

Figure 4F:
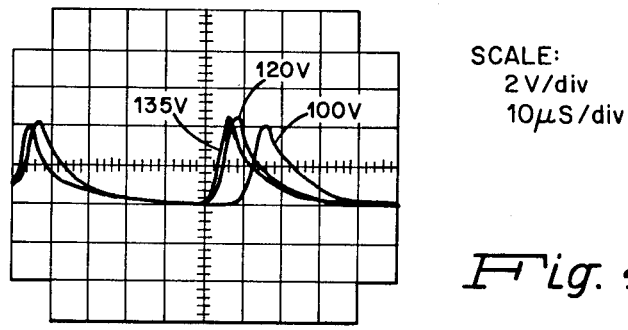
Figure 4G:
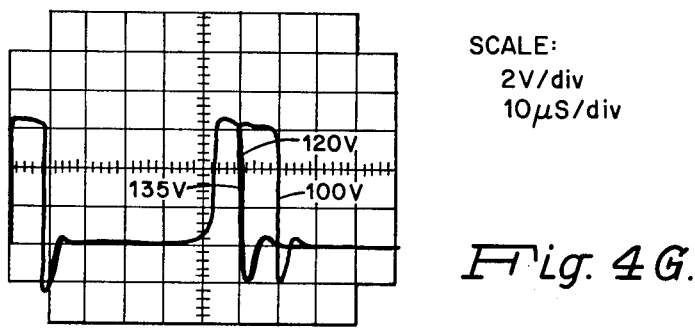
Figure 4H:
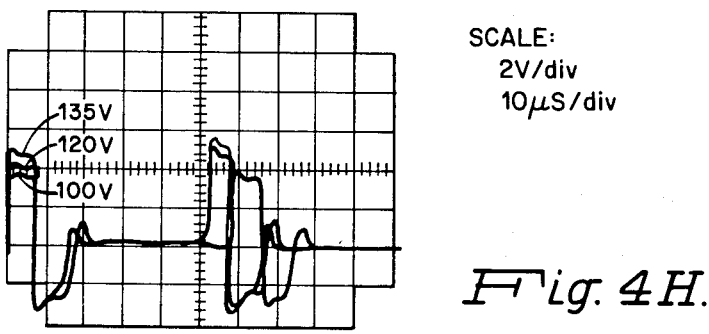

FIGS. 4F through 4H show changes in pulses width and slight changes in frequency as a function of changes in line voltage at points I, K and F, respectively.

By way of illustration, the component values selected for the preferred embodiment of the present invention are as listed in the table below.

TABLE

| capacitor 142 | 220 microfarads |
|---|---|
| resistor 156 | 20 kilohms |
| capacitor 162 | .1 microfarads |
| capacitor 163 | 1 microfarad |
| resistor 164 | 47 ohms |
| resistor 166 | 220 ohms |
| capacitor 168 | .0068 microfarads |
| capacitor 172 | 680 microfarads |
| resistor 174 | 1.8 kilohms |
| capacitors 206 & 216 | 1.1K microfarads |
| resistor 242 | 16 kilohms |
| resistor 246 | 10 kilohms |
| resistor 248 | 10 kilohms |
| capacitor 250 | .0015 microfarads |
| capacitor 256 | 160 microfarads |
| capacitor 307 | 1 microfarad |
| resistor 308 | 5 kilohms |
| capacitor 312 | 24 picofarads |
| capacitor 314 | 1 microfarad |
| resistor 316 | 1.0 kilohms |

In summary, the invention provides a novel power supply in which pulse width and frequency control the amount of energy stored and transferred as a function of line and load conditions. This arrangement of the invention reduces the complexity of the power supply to a minimum while facilitating its construction from standard integrated circuits.

It will be obvious to those skilled in the art that many changes may be made to the preferred embodiment. For example, the embodiment may be modified for use with other input line voltages and to provide any desired output voltages.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A switching regulator power supply for supplying power to a load, said supply being coupled to a source of input AC line voltage through a source of rectified AC line voltage and having a regulation cycle of operation including an energy storage cycle, said supply comprising:
   input capacitor means coupled to said DC source means for storing said rectified AC voltage, said rectified AC voltage having a magnitude which varies as a function of changes in said AC line voltage;
   primary transformer means connected to said DC source and to said input capacitor means;
   pulse generator circuit means coupled to said primary transformer means for generating pulses having a variable pulse width at a variable frequency rate for causing current to flow through said primary transformer means during said energy storage cycle; and,
   input network means including a series resistor means and capacitor means, said network means having an output terminal and a plurality of input terminals connected to said generator circuit means, to said input capacitor means and to said load respectively, said input network means being operative during a first time interval to charge said capacitor means through said resistor means to a first predetermined threshold voltage at a rate directly proportional to said magnitude of said rectified AC voltage for switching the state of said pulse generator circuit means and said input network means being operative during a second time interval to discharge said capacitor means at a predetermined rate through said pulse generator circuit means to a second predetermined threshold voltage for triggering said generator circuit means in accordance with changes in said load, said first time interval corresponding to said pulse width which is directly proportional to the value of said AC line voltage so as to minimize energy during said energy storage cycle and maintain a constant transfer of energy to said load.

2. The supply of claim 1 wherein said series resistor means is adjustable, said series resistor means being adjusted to a value at a nominal value of said AC voltage to charge said capacitor at a predetermined rate so as to provide an output pulse having a predetermined pulse width.

3. The supply of claim 2 wherein said predetermined pulse width approximates 6 microseconds.

4. The switching regulator power supply of claim 1 wherein said supply further includes:
   secondary circuit means for providing a desired output voltage to said load, said secondary circuit means being AC coupled to said primary transformer winding means so as to permit current flow in a second predetermined direction opposite to said first predetermined direction during said energy transfer cycle for transferring energy to said load; and,
   voltage frequency conversion means, said conversion means being connected to said secondary circuit means and to said pulse circuit generating means, said frequency conversion means being operative to vary the frequency of the variable width pulses generated by said pulse circuit means within a desired range for controlling said transfer of energy in accordance with changes in said load and in said AC line voltages in a manner which minimizes power consumption.

5. The power of claim 4 wherein said variable width pulses by varying with line voltages permits the variation in frequency within said desired range which is inaudible and less subjected to noise thereby minimizing said power consumption and maximizing said transfer of energy.

6. The power supply of claim 4 wherein said voltage frequency conversion means includes:
   error amplifier means connected to said secondary circuit means, said error amplifier means generating an error voltage indicative of the change in load energy requirements; and,
   DC coupling means connected to said error amplifier mans and to said pulse circuit generating means, said DC coupling means being operative in response to said error voltage to vary said frequency of said generating means for controlling said transfer of energy.

7. The power supply of claim 6 wherein said secondary circuit means includes a plurality of secondary windings, each secondary winding having a unidirectional current conducting device connected in series with said secondary winding so as to inhibit current flow to said load during said energy storage cycle and to enable current flow to said load during said energy transfer cycle.

8. A switching regulator power supply for supplying power to a load, said supply being coupled to a source of input AC line voltage through a DC source of rectified AC line voltage and having a regulation cycle of operation including an energy storage cycle, said supply comprising:
   input capacitor means coupled to said DC source means for storing sid rectified AC voltage, said AC voltage having a magnitude which varies as a function of changes in said AC line voltage;
   primary transformer means connected to said DC source and to said input capacitor means;
   voltage regulator circuit means having an input terminal and an output terminal, said input terminal being connected to said input capacitor means and to said primary transformer means, said regulator circuit means being operative to generate a predetermined output voltage when said AC rectified voltage stored by said capacitor means reaches a nominal value for enabling current to flow through said primary transformer in a first predetermined direction; and,
   pulse generator circuit means for generating pulses having a variable pulse width at a variable frequency rate, said generator circuit means having a voltage supply input connected to said output terminal of said regulator circuit means, a trigger input terminal and a threshold input terminal connected in common, an output terminal and a discharge input terminal, said pulse generator circuit means including:
   an input RC network consisting of a first resistor having one end connected to said input capacitor means and the other end connected to said discharge input terminal, a second resistor having one end connected to said discharge input terminal and the other end connected to said threshold input terminal and a capacitor having one end connected to said threshold terminal and the other end connected to a common reference voltage and, a diode having anode and cathode teerminals, said anode terminal being connected to said discharge input terminal and said cathode terminal being connected to said threshold input terminal, said diode being forward biased during a first time interval during which said capacitor is being charged through said first resistor to a first predetermined threshold voltage at a rate established by said magnitude of AC rectified voltage for switching the state of said pulse generator circuit means and said diode being reversed biased during a second time interval during which said capacitor discharges through said second resistor and said discharge input terminal to a second predetermined threshold voltage for triggering said generator circuit means, said first time interval corresponding to said pulse width which is directly proportional to said AC line voltage so as to minimize energy and maintain a constant transfer of energy to said load.

9. The supply of claim 8 wherein said first resistor is adjustable, said first resistor being adjusted to a value at a nominal value of said AC voltage to charge said capacitor at a predetermined rate so as to provide an output pulse having a predetermined pulse width.

10. The supply of claim 9 wherein said predetermined pulse width approximates 6 microseconds.

11. The switching regulator power supply of claim 8 wherein said supply further includes:

secondary circuit means for providing a desired output voltage to said load, said secondary circuit means being AC coupled to said primary transformer winding means so as to permit current flow in a second predetermined direction opposite to said first predetermined direction during said energy transfer cycle for transferring energy to said load; and, voltage frequency conversion means, said conversion means being connected to said secondary circuit means and to said threshold input terminal of said pulse circuit generating means, said frequency conversion means being operative to vary the frequency of the variable width pulses generated by said pulse circuit means within a desired range by controlling the voltage applied to said threshold input terminal for controlling said transfer of energy in accordance with changes in said load and said AC line voltages in a manner which minimizes power consumption.

12. The supply of claim 11 wherein said variable width pulses by varying with line voltages permits the variation in frequency within said desired range which is inaudible and less subjected to noise thereby minimizing said power consumption and maximizing energy transfer.

* * * * *